United States Patent
Haasz et al.

(10) Patent No.: US 8,757,508 B2
(45) Date of Patent: Jun. 24, 2014

(54) TEMPERATURE RESPONSIVE FLUID FLOW CONTROL DEVICE

(75) Inventors: Andras D Haasz, Bristol (GB); Alexander E H Fitzhugh, Bristol (GB); Christopher J Burden, Cardiff (GB); Jonathan Wilson, Ashby-de-la-Zouch (GB); Samuel M Sampson, Bristol (GB); Derek Clarke, Bristol (GB)

(73) Assignee: Rolls-Royce PLC, London (GB)

( * ) Notice: Subject to any disclaimer, the term of this patent is extended or adjusted under 35 U.S.C. 154(b) by 1063 days.

(21) Appl. No.: 12/756,750

(22) Filed: Apr. 8, 2010

(65) Prior Publication Data
US 2010/0288376 A1    Nov. 18, 2010

(30) Foreign Application Priority Data
May 15, 2009  (GB) .................................. 0908373.4

(51) Int. Cl.
*G05D 23/02* (2006.01)
(52) U.S. Cl.
USPC ...................... 236/102; 236/93 R; 236/101 R
(58) Field of Classification Search
USPC ..................... 236/93 R, 101 R, 102; 137/468
See application file for complete search history.

(56) References Cited

U.S. PATENT DOCUMENTS

| | | | | |
|---|---|---|---|---|
| 3,814,313 | A | * | 6/1974 | Beam et al. ................. 236/93 R |
| 4,805,398 | A | * | 2/1989 | Jourdain et al. ................. 60/806 |
| 6,126,390 | A | | 10/2000 | Böck |
| 6,485,255 | B1 | | 11/2002 | Care et al. |

FOREIGN PATENT DOCUMENTS

GB            2 354 290 A        3/2001

OTHER PUBLICATIONS

Great Britain Search Report issued in Great Britain Application No. GB 1005805.5 on Apr. 15, 2010.
Great Britain Search Report issued in Great Britain Application No. GB 0908373.4 on Sep. 10, 2009.

* cited by examiner

*Primary Examiner* — Cheryl J Tyler
*Assistant Examiner* — Jonathan Bradford
(74) *Attorney, Agent, or Firm* — Oliff PLC

(57) ABSTRACT

A fluid flow control device has an annular fixed body with at least one aperture in an annular surface thereof. When in use, fluid is arranged to flow through the at least one aperture. A thermally responsive annular valve element is mounted concentrically with respect to the fixed body. The configuration of the annular valve element is changeable with temperature so as to control the flow of fluid through the at least one aperture.

4 Claims, 3 Drawing Sheets

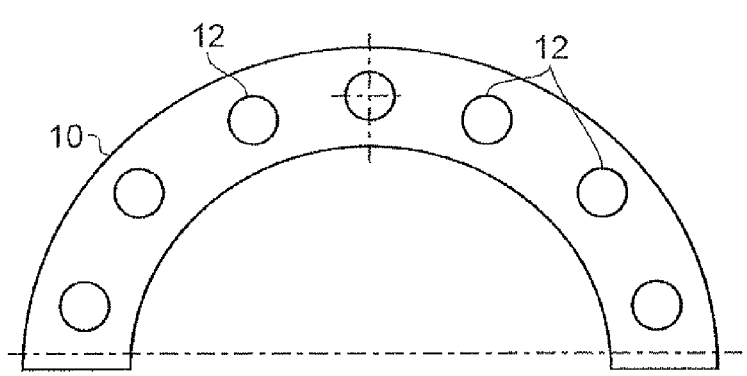
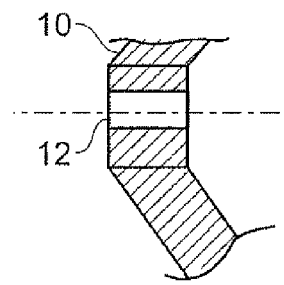
FIG. 1a
FIG. 1b
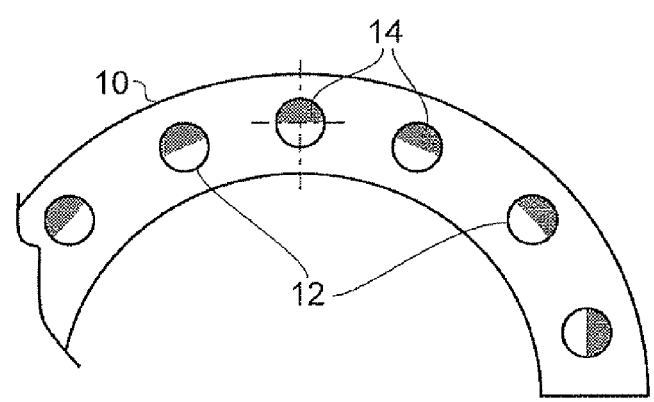
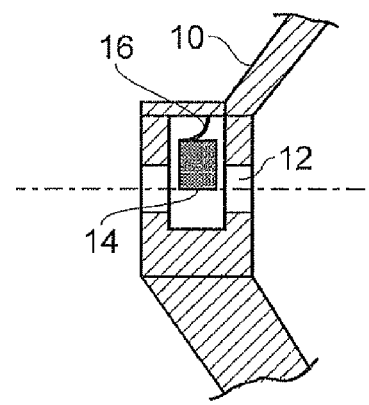
FIG. 2a
FIG. 2b
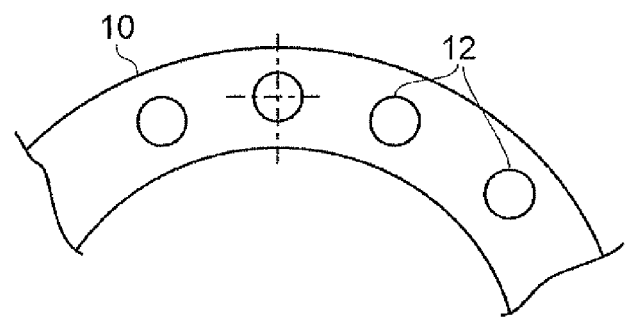
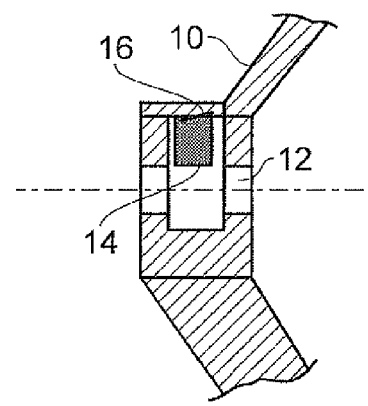
FIG. 3a
FIG. 3b

TEMPERATURE RESPONSIVE FLUID FLOW CONTROL DEVICE

The present invention relates to a fluid flow control device and is particularly concerned with a fluid flow control device for use in a gas turbine engine.

During a flight cycle of an aircraft a gas turbine engine is required to provide varied performance, such as take off and cruise, and its turbine stage, which is subject to a jet of hot gases, undergoes a range of operating temperatures. To control component temperature air is bled from a compressor stage to the turbine stage to maintain an even turbine temperature. Ducting air from the compressor reduces engine efficiency and it is therefore desirable to minimise this bleed whenever and wherever it is possible to do so.

It is known to control internal cooling flows with generally ring-shaped restrictors in the flow circuit. Such restrictors incorporate a number of apertures around the ring. FIGS. 1a and 1b show schematically in front and cross section a previously considered restrictor device 10, with holes 12 arranged around the periphery for the flow of cooling air. The holes are sized so as to give the required flow at a prescribed design point, and then checked to ensure the cooling system is adequate at other conditions. Whilst the flow area of the restrictor holes is fixed, flow variation can be achieved by changing the performance of air seals (not shown) in the system. The most demanding design point is the maximum continuous condition that the engine will encounter, and this is where the turbine components experience the highest metal temperatures. This condition determines the maximum cooling airflow and therefore the size of the holes.

The fixed flow-area restrictors in the cooling air system are only optimum at the chosen design point. As a result, when the engine operates off-design, ie away from the optimum, the turbine components may be over-cooled. However, the engine might deliver better performance if less cooling air was bled from the main gas path. Less cooling air might mean less loss which in turn could mean higher overall efficiency and a lower specific fuel consumption.

It is important that turbine components, such as turbine blades, are cooled sufficiently for them to operate in extremely hot conditions and sometimes high centrifugal fields. However, thermal cycling reduces the life of components so a constant temperature is beneficial. In addition, a constant component temperature is preferable in order to control thermal expansions and thus component-to-component clearances.

The ability of a cooling system to reduce unnecessary compressor bleed and to have a minimised response time can enhance engine efficiency and longevity of the engine components.

Attempts to switch the cooling flow using actuated systems have led to added weight, additional cost and complexity for the engine as well as introducing additional failure modes.

It is an object of the present invention to provide a cooling airflow control system for a gas turbine engine which is rapidly able to respond to the operating conditions of the engine, and which promotes fuel efficiency of the engine by optimising the flow of cooling air in the engine.

According to the present invention there is provided a fluid flow control device for regulating the flow of fluid in a passage, the device comprising an annular fixed body having a plurality of apertures in an annular surface thereof, through which fluid is arranged to flow in use, and a thermally responsive annular valve element that comprises a shaped memory metal material mounted concentrically with respect to the fixed body, configured such that substantially all of the annular valve element changes in diameter with temperature by substantially the same amount between a first diameter in which it at least partly obstructs each of the apertures and a second diameter in which it does not obstruct, or obstructs to a lesser extent, each of the apertures so as to control the flow of fluid through the plurality of apertures.

The valve element is of a shaped memory metal material, such that its diameter changes with temperature. It may be mounted on the fixed body by means of a resilient element.

Preferably the resilient element maintains the concentric relationship of the fixed body and valve element.

The valve element is changeable between a first configuration in which it at least partly obstructs the at least one aperture and a second configuration in which it does not obstruct, or obstructs to a lesser extent, the at least one aperture.

The device may be arranged to regulate the flow of cooling air in an engine.

Embodiments of the present invention will now be described by way of example only with reference to the accompanying drawings in which:

FIGS. 1a and 1b show schematically an embodiment of a previously considered cooling flow restrictor;

FIGS. 2a and 2b show schematically a fluid flow control device according to a first embodiment of the present invention, in a first configuration;

FIGS. 3a and 3b show schematically the embodiment of FIG. 2 in a second configuration;

Figure 4:
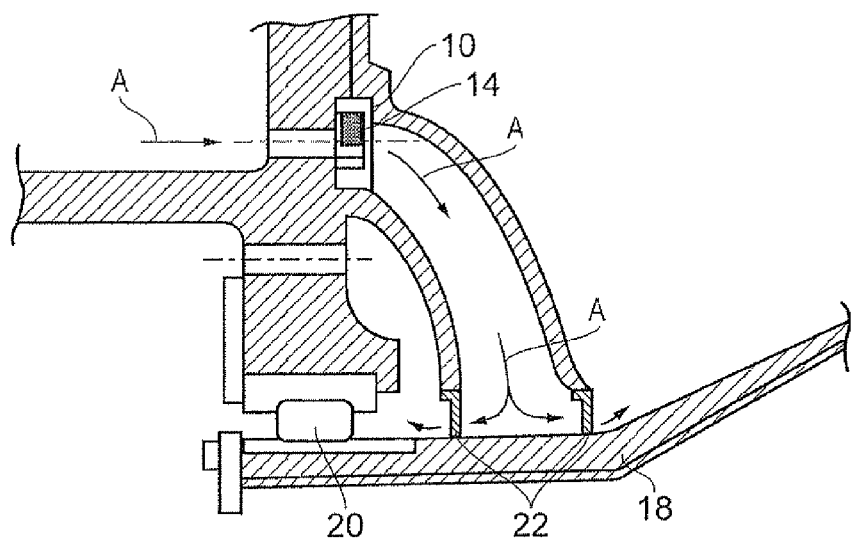
FIG. 4 shows schematically in section a first portion of a gas turbine engine in which a fluid flow control device according to an embodiment of the present invention has been incorporated.

FIGS. 2a and 2b show schematically in front and sectional views respectively a cooling airflow control device according to a preferred embodiment of the present invention in a first configuration. The annular restrictor 10 is substantially the same as the example considered previously and comprises an alloy ring with a plurality of equally spaced apertures 12 around its annular surface, through which cooling air is arranged to flow in use. Behind, ie downstream of the upstream face of, the holes 12 of the restrictor 10 is a thermally responsive annular valve element 14 comprising a ring made of, for example, a titanium-nickel shape memory metal (SMM) which is attached to the restrictor 10 by a centralising spring 16. The spring 16 may be made of spring steel, and is sized to centrally locate the valve element 14 relative to the array of holes 12 in the restrictor 10. The spring 16 may be provided as a split ring, a continuous ring, or a series of leaf members. Depending upon the operating temperature, the spring 16 may alternatively be made of rubber or plastic, and may be in the form of an "O" ring. An "O" ring type spring would advantageously provide additional sealing. The annular valve element 14 may exclusively comprise shape memory metal. Alternatively the annular valve element 14 may part comprise shape memory metal, for example a valve element mounted on a shape memory metal carrier.

It can be seen from FIGS. 2a and 2b that the element 14 partially obstructs each of the holes 12 of the restrictor 10, thereby restricting the flow of cooling air through the apertures 12. Thus control of the flow of cooling air is achieved through alteration of the geometry or flow characteristics (ie the discharge coefficient) of apertures 12.

The thermally responsive valve element 14 begins to change its diameter once a predetermined temperature is reached due to the phase change experienced by this type of material. Specifically, the diameter of the element 14 increases significantly above a particular temperature, the increase exceeding that of normal material thermal expansion. Once the temperature falls back below a threshold the element 14 returns to its previous size.

Substantially all of the annular valve element 14 changes in diameter with temperature by substantially the same amount. That is to say the valve element 14 changes from having a first diameter to a second diameter, where substantially the entire valve element 14 changes in diameter (i.e. expands or contracts radially) by the same amount.

FIGS. 3a and 3b show schematically, in front and sectional views respectively, the control device of FIGS. 2a and 2b in a second configuration.

In FIGS. 3a and 3b the element 14 has increased in diameter sufficiently that it no longer obstructs the holes 12 in the restrictor 10. The increase in diameter has occurred due to a threshold temperature being exceeded beyond which the SMM material of element 14 undergoes a significant increase in size.

At cruise conditions, ie when a gas turbine engine is operating in a steady state and a specified maximum fuel consumption is required, the element 14 is designed to close the holes 12 in the restrictor 10 to a level which is optimum for running the turbine.

When the engine is accelerated its temperature increases and the SMM alloy material experiences a phase change. The ring 14 then assumes a larger diameter, which allows more cooling air to pass through the holes 12 and into the turbine, which is now running at hotter conditions. The sizing of the ring element 14 and the channel which it controls are chosen to optimize the flow of cooling air. The centralising spring 16 maintains the element 14 in concentric relation with the restrictor 10 and hence the ring of holes 12, and the spring 16 is compressed as the ring 14 assumes a larger diameter. The device shown in FIGS. 2a, 2b and 3a and 3b can be used to control the flow of cooling air to the rotor system or to static components of a gas turbine engine.

FIG. 4 shows in schematic sectional view a part of a rotor system in a gas turbine engine including a rotor shaft 18, bearing 20 and seals 22. Arrows A show the direction of cooling buffer air which flows to the seals and shaft. The cooling air flows through a restrictor 10 which includes a thermally responsive annular valve element 14 as described above.

Figure 5:
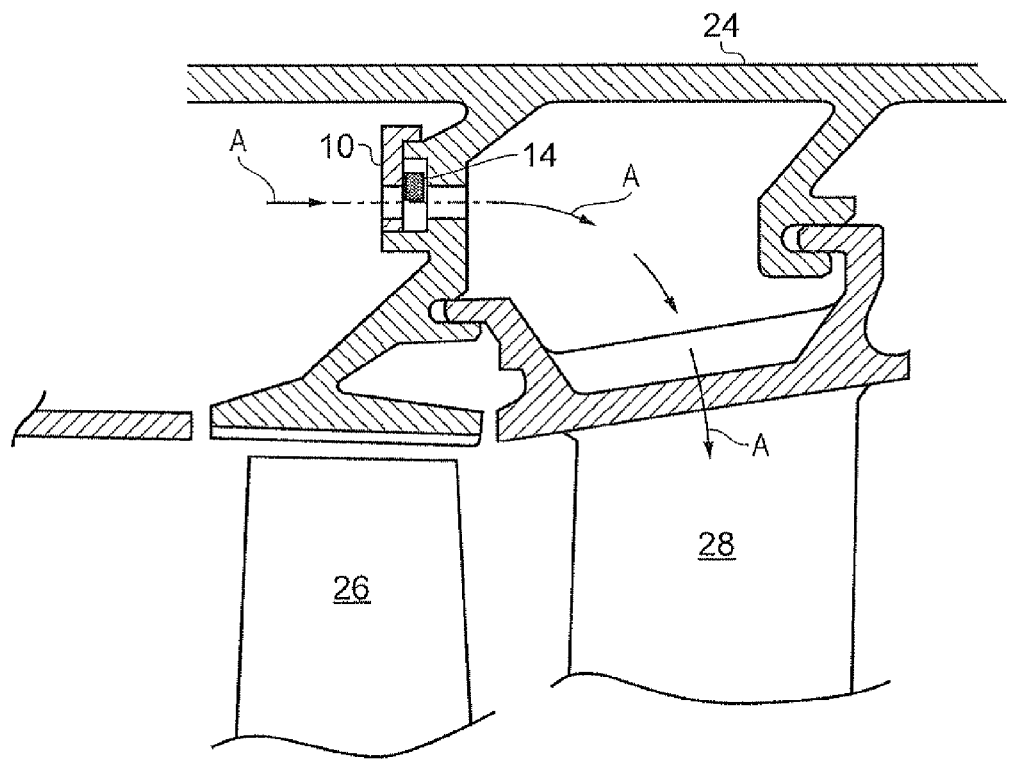
FIG. 5 shows schematically in section a second portion of a gas turbine engine in which a fluid flow control device according to an embodiment of the present invention has been incorporated.

FIG. 5 shows in schematic sectional view another part of a gas turbine engine including an engine casing 24, a turbine blade 26 and a turbine vane 28. Once again the direction of cooling airflow is depicted by arrows A. The cooling flow passes through a restrictor 10 having a thermally responsive annular valve element 14 as described above, and into or onto the turbine vane 28.

Figures 6A, 6B:
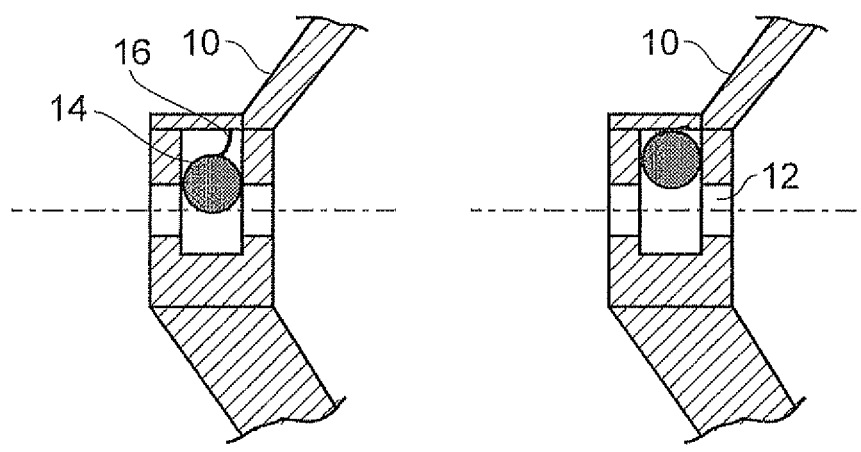
FIGS. 6a and 6b show an alternative embodiment of control device in accordance with the present invention.

FIGS. 6a and 6b show an alternative embodiment of the invention in which the thermally responsive valve element 14 has a different cross section, in this case circular, which may be easier to manufacture or else may be more suited to a particular application.

FIG. 6a shows the valve element 14 in a first, cold configuration in which it partially obstructs the apertures 12, and FIG. 6b shows the valve element in a second, hot configuration in which it does not obstruct the apertures 12.

The above described embodiments of the invention have been illustrated in the example of a gas turbine engine. However, the skilled person will realise that there are other uses of the device, where fluid flow must be regulated, such as in ducts and pipes in industrial processes for example, which do not depart from the scope of the invention as defined in the claims.

The invention claimed is:

1. A fluid flow control device for regulating the flow of fluid in a passage, the device comprising:
    an annular fixed body having a plurality of apertures in an annular surface thereof, through which fluid is arranged to flow in use, and
    a thermally responsive annular valve element that comprises:
        a shaped memory metal material mounted concentrically with respect to the fixed body, configured such that substantially all of the annular valve element changes along its entire diametrical length with temperature by substantially the same amount between a first diameter in which it at least partly obstructs each of the apertures and a second diameter in which it does not obstruct, or obstructs to a lesser extent, each of the apertures so as to control the flow of fluid through the plurality of apertures, wherein
    the valve element is mounted on the fixed body by means of a resilient element, the resilient member being a split ring, a continuous ring or a series of leaf members.

2. A device according to claim 1 wherein the resilient element maintains the concentric relationship of the fixed body and valve element.

3. A device according to claim 1 wherein the device is arranged to regulate the flow of cooling air in an engine.

4. A fluid flow control device for regulating the flow of fluid in a passage, the device comprising:
    an annular fixed body having a plurality of apertures in an annular surface thereof, through which fluid is arranged to flow in use, and
    a thermally responsive annular valve element that comprises:
        a shaped memory metal material mounted concentrically with respect to the fixed body, configured such that substantially all of the annular valve element changes along its entire diametrical length with temperature by substantially the same amount between a first diameter in which it at least partly obstructs each of the apertures and a second diameter in which it does not obstruct, or obstructs to a lesser extent, each of the apertures so as to control the flow of fluid through the plurality of apertures, wherein
    the valve element is mounted on the fixed body by means of a resilient element, the resilient element being a distinct piece that is in direct contact with each of the annular valve element and fixed body.

* * * * *